United States Patent [19]

Paek et al.

[11] Patent Number: 4,594,088
[45] Date of Patent: Jun. 10, 1986

[54] METHOD AND APPARATUS FOR MAKING, COATING AND COOLING LIGHTGUIDE FIBER

[75] Inventors: Un-Chul Paek, West Windsor Township, Mercer County; Charles M. Schroeder, North Hanover Township, Burlington County, both of N.J.

[73] Assignee: AT&T Technologies, Inc., Berkeley Heights, N.J.

[21] Appl. No.: 737,988

[22] Filed: May 28, 1985

[51] Int. Cl.⁴ .................. C03C 25/02; C03B 37/025
[52] U.S. Cl. ............................................ 65/3.4; 65/2; 65/11.1; 65/12; 118/405; 427/163
[58] Field of Search ................ 65/2, 3.4, 3.43, 3.11, 65/3.44, 11.1, 12; 118/405; 427/163

[56] References Cited

U.S. PATENT DOCUMENTS

| | | | |
|---|---|---|---|
| 3,933,454 | 1/1976 | DeLuca | 65/3 |
| 3,977,854 | 8/1976 | Fulmer et al. | 65/10.1 X |
| 4,154,592 | 5/1979 | Bailey | 65/2 |
| 4,208,200 | 6/1980 | Claypoole et al. | 65/11 |
| 4,388,093 | 6/1983 | Kimura et al. | 65/12 X |
| 4,396,409 | 8/1983 | Bailey et al. | 65/3.11 |
| 4,409,263 | 10/1983 | Aloisio, Jr. et al. | 427/163 |
| 4,437,870 | 3/1984 | Miller | 65/12 |
| 4,504,300 | 3/1985 | Gauthier et al. | 65/12 X |

FOREIGN PATENT DOCUMENTS 2044751 10/1980 United Kingdom .

*Primary Examiner*—Robert Lindsay
*Attorney, Agent, or Firm*—D. J. Kirk

[57] ABSTRACT

An apparatus (30) for cooling a lightguide fiber (21) drawn from a molten portion of a glass preform (22) located in a furnace (23). The apparatus (30) has an upper chamber (34) and a lower chamber (36) each having a small opening in the lower portions thereof. The upper chamber (34) has a heat transfer liquid (35) therein and the lower chamber (36) is pressurized to prevent liquid from passing through the opening. The hot fiber (21) is cooled by the liquid as it is drawn through liquid (35) without physical contact with the periphery of the openings.

14 Claims, 4 Drawing Figures

METHOD AND APPARATUS FOR MAKING, COATING AND COOLING LIGHTGUIDE FIBER

TECHNICAL FIELD

The invention relates to a technique for fabricating lightguide fiber. In particular, the fiber drawn from a lightguide preform is rapidly cooled prior to applying a coating thereto.

BACKGROUND OF THE INVENTION

The successful implementation of a lightwave communication system requires the manufacture of high quality lightguide fibers having mechanical properties sufficient to withstand stresses to which they are subjected. Typically, the fiber has an outside diameter of 0.125 mm and is drawn from a glass preform having an outer diameter of 17 mm. Each fiber must be capable of withstanding, over its entire length, a maximum stress level which the fiber will encounter during installation and service. The importance of fiber strength becomes apparent when one considers that a single fiber failure will result in the loss of several hundred circuits.

The failure of lightguide fibers in tension is commonly associated with surface flaws which cause stress concentrations and lower the tensile strength from that of the pristine unflawed glass. The size of the flaw determines the level of stress concentration and, hence, the failure stress. Even micron-sized surface flaws cause stress concentrations which significantly reduce the tensile strength of the fibers.

Long lengths of lightguide fibers have considerable potential strength but the strength is realized only if the fiber is protected with a layer of a coating material such as a polymer, for example, soon after it has been drawn from a preform. This coating serves to prevent airborne particles from impinging upon and adhering to the surface of the drawn pristine fiber which would serve to weaken it. Also, the coating shields the fiber from surface abrasion, which could be inflicted by subsequent manufacturing processes and handling during installation, provides protection from corrosive environments and spaces the fibers within cable structures. Thus, it is common to apply a coating material to the outer surface of the fiber. Typical coating cups used to apply such coating materials are shown in U.S. Pat. Nos. 4,409,263 and 4,208,200. Accordingly, the drawn fiber passes through the coating cup after being drawn from the preform and prior to reeling.

It is necessary that the fiber, which is heated to approximately 2000° C. during the drawing operation, be cooled to below 80° C. prior to applying the coating. The cooling of the fiber is necessary in order to avoid heating and charring of the coating material resulting in an unacceptable coated fiber.

One technique for cooling the fiber is to decrease the drawing speed to permit the fiber to sufficiently cool prior to entering the coating material. Such a method can provide an acceptable coating but undesirably results in low quantity of product for a given time period.

An additional technique is to provide a substantial distance between the drawing furnace and the coating cup. This distance provides sufficient time for the fiber to cool before coating. Unfortunately, the equipment to maintain such distances is expensive and many factories do not have the necessary vertical height (e.g., 10 meters) available.

A third method for cooling the drawn fiber is described in U.S. Pat. No. 4,208,200. That patent depicts a vessel containing a liquid coating material interposed between a furnace and the coating cup which is used to precoat and cool the fiber. The fiber passes through the liquid and through a wiper in the bottom of the cup. The high heat transfer coefficient of the material provides cooling of the fiber which permits a closer physical relation between the coating cup and the furnace and/or a higher drawing speed. However, as indicated above, physical contact with the pristine fiber with an apparatus such as a wiper can deleteriously weaken the coated fiber.

Accordingly, there is a need for a technique which rapidly cools the drawn fiber while avoiding any physical contact therewith.

SUMMARY OF THE INVENTION

The foregoing problems have been overcome by a method of fabricating a lightguide fiber, comprising the steps of: drawing the fiber from a heated lightguide preform; moving the fiber into a cooling liquid in an upper chamber having an aperture in the lower portion thereof; and further moving the fiber, cooled by the liquid, through the aperture into a lower chamber pressurized with a gas pressure sufficient to substantially prevent liquid from passing through the aperture.

DETAILED DESCRIPTION

Figure 1:
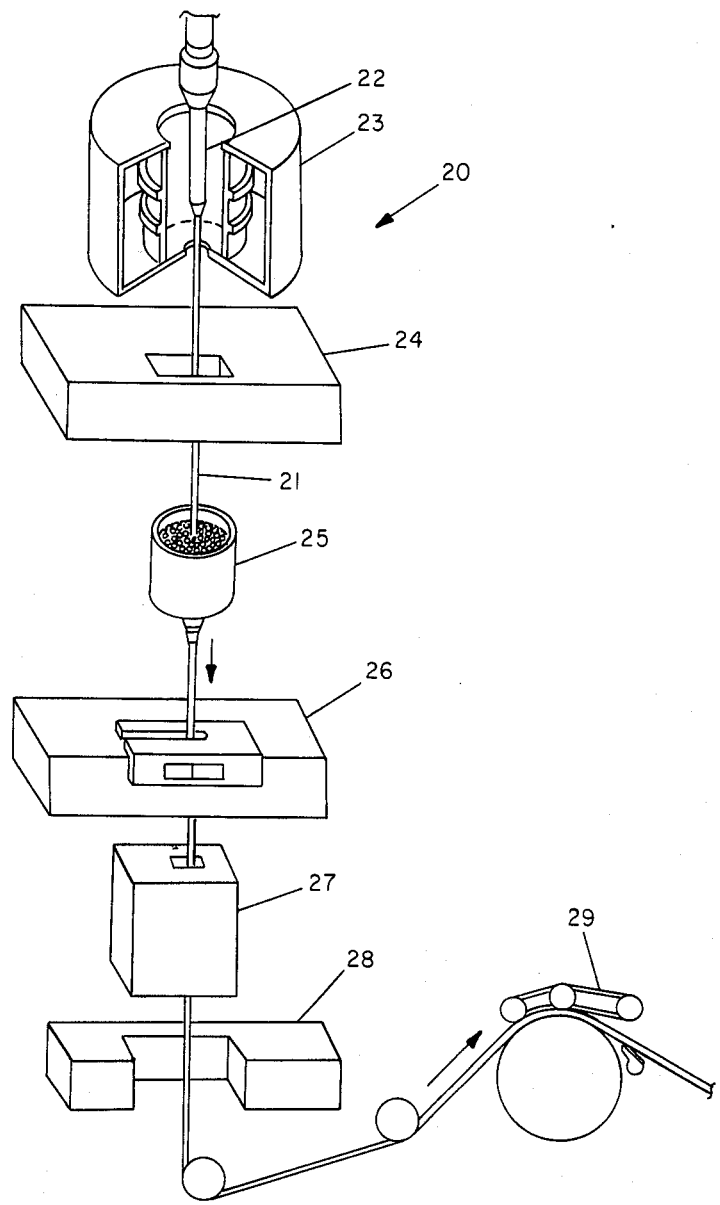
FIG. 1 is a general isometric view of a lightguide drawing system.

FIG. 1 shows a well known apparatus designated generally by the numeral 20 which is used to draw a lightguide fiber 21 from a specially prepared cylindrical preform 22 and to then coat the fiber. The lightguide fiber 21 is formed by locally and symmetrically heating the preform 22 which is typically 17 mm in diameter and 60 cm in length to a temperature of about 2000° C. As the preform 22 is fed axially into and through a furnace 23, the fiber 21 is drawn from the molten material.

The diameter of the fiber 21 is measured by a device 24 at a point below the furnace 23 and that information is forwarded to a control system (not shown). Within the control system, the measured diameter is compared to the desired value and an output signal is generated to adjust the draw speed such that the diameter of the fiber 21 approaches the desired value.

After the diameter of the fiber 21 is measured, a protective coating is applied by an apparatus 25. Then the coated fiber 21 passes through a centering gauge 26, a device 27 for curing the coating and a device 28 for measuring the outer diameter of the coated fiber, moved through a capstan 29 and is spooled for testing and storage prior to subsequent operations. The preservation of the intrinsically high strength of lightguide fibers is important during later ribboning, jacketing, connectorization and cabling of the fibers. Preservation of fiber strength requires the application of the protective coating, which shields newly drawn fiber from the deleterious effects of the atmosphere.

Figure 2:
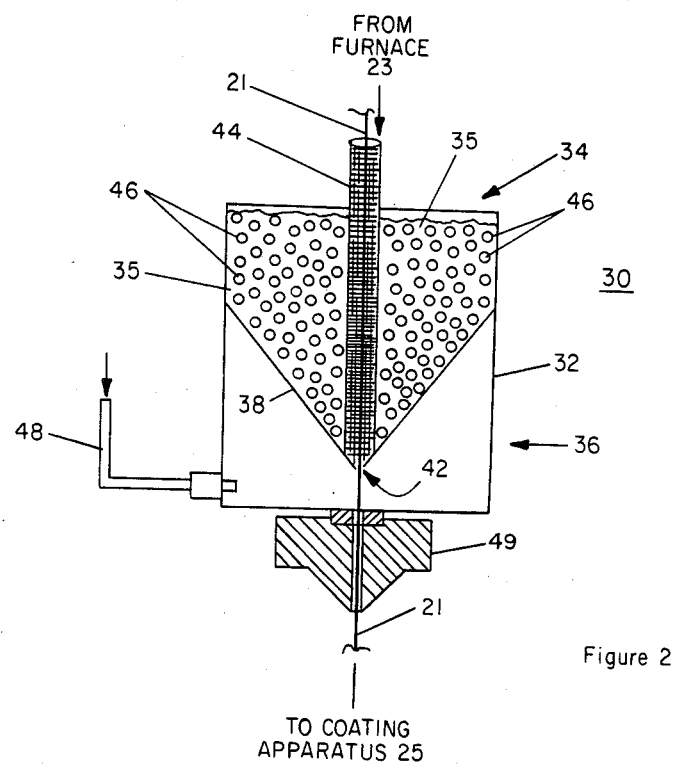
FIG. 2 is an isometric view of a fiber cooling apparatus embodying the instant inventive concepts.

Such a technique has proved effective for fabricating lightguide fiber 21. However, such an apparatus is limited in the velocity of the drawn fiber 21 as hereinbefore set forth. A fiber cooling apparatus generally indicated by the numeral 30 shown in FIG. 2 which is interposed between the furnace 23 and the coating apparatus 25 overcomes the foregoing problem. The cooling apparatus 30 is comprised of a housing 32 separated into upper 34 and lower 36 chambers by a separating means 38 having an opening 42 in the central portion thereof. The upper chamber 34 is adapted to contain a liquid 35 (e.g., Freon, dionized water or silane) and has a cylindrical screen 44 therein which is surrounded by a multitude of chips of plastic or glass beads 46—46. The lower chamber 36 has an inert gas (e.g., helium, nitrogen or the like), input tube 48 and a nozzle 49 affixed thereto. The inert gas is directed into the lower chamber 36 via the tube 48 to provide a pressure in the lower chamber sufficient to prevent the liquid 35 in the upper chamber 34 from passing through the opening 42.

In operation, with liquid 35 in the upper chamber 34 and the lower chamber 36 under pressure, the lightguide fiber 21 is drawn from the preform 22 (see FIG. 1) and passes axially through the cylindrical screen 44, the opening 42 and the nozzle 49, the fiber making contact with only the liquid 35. The heat transferred to the liquid contacting the fiber 21 rapidly lowers the temperature thereof to allow increased fiber drawing velocities and/or allow a relatively short distance between the furnace 23 and coating apparatus 25. Advantageously, by maintaining a gas pressure in the lower chamber 36, the fiber 21 can pass through the cooling apparatus 30 without contacting any surfaces that can abrade or scrape the fiber. The temperature of the liquid 35 in the upper chamber 34 can be kept relatively low by recirculating the liquid and/or providing external cooling in a well known manner.

The chips 46—46 preclude turbulence within the liquid 35 resulting in a laminar liquid flow. Such laminar flow substantially precludes lateral movement of the fiber 21 passing through the apparatus 30 which eliminates contact of the fiber with the periphery of the opening 42.

The foregoing apparatus 30 has been found to be most effective for cooling a drawn fiber 21. However, from time to time a small amount of liquid 35 will be pulled through the opening 42, build up in the lower chamber 36 and be drawn out through the nozzle 49. It is undesirable to have liquid on the fiber 21 as it moves through the coating apparatus 25 for the liquid inhibits the application of a uniform coating on the fiber.

Figure 4:
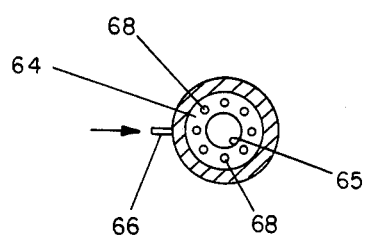
FIG. 4 is a cross-sectional view of an evaporator used to implement the instant invention.
Figure 3:
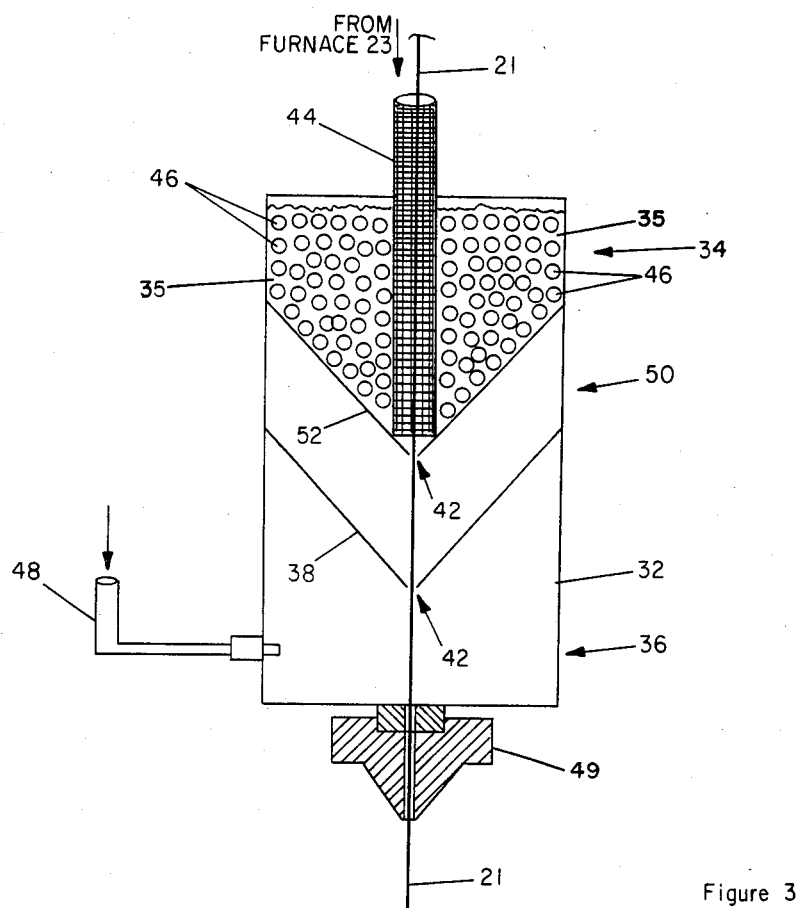
FIG. 3 is a schematic diagram of an additional exemplary embodiment of the instant invention.
Figure 3:
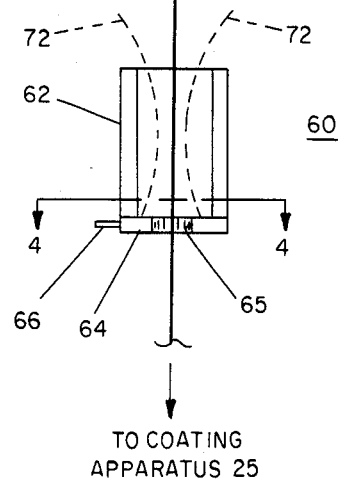

Accordingly, in a further exemplary embodiment shown in FIG. 3 an additional chamber 50 was formed by adding a second separating means 52. Any liquid 35 flowing from the upper chamber 34 becomes trapped in the second chamber 50 by the dividing means 38. Additionally, any residue moisture on the fiber may be removed by an evaporator 60 (see FIG. 3) interposed between the cooling apparatus 30 and the coating apparatus 25. The evaporator 60 is comprised of a cylindrical housing 62 with a toroidal plenum 64 having a central opening 65 at its base. The plenum 64 has a gas input conduit 66 at a lateral edge and also has a plurality of apertures 68 on the upper surface thereof as shown in FIG. 4.

As the fiber 21 moves axially through the evaporator 60, gas (e.g., helium) is directed into he plenum 64 via the conduit 66. The gas then passes through the openings 68—68 and moves upward within the housing 62 as indicated by the dashed lines 72—72 to remove any moisture remaining on the drawn fiber 21.

In a standard lightguide fiber 21 drawing apparatus depicted in FIG. 1, having a distance of 0.9 meters between the bottom of the furnace 23 and the top of the coating apparatus 25, the maximum line speed for coating was 0.7 meters/second. However, using the same facility with the apparatus of FIG. 3 the maximum speed was increased to 3.7 meters/second without the evaporator 60 and 5.2 meters/second with the evaporator in place.

It is to be understood that the embodiments described herein are merely illustrative of the principles of the invention. Various modifications may be made thereto by persons skilled in the art which will embody the principles of the invention and fall within the spirit and scope thereof.

What is claimed is:

1. A method of fabricating a lightguide fiber, comprising the steps of:
    drawing the fiber from a heated lightguide preform;
    moving the fiber into a cooling liquid in an upper chamber having an aperture in the lower portion thereof; and
    further moving the fiber, cooled by the liquid, through in a non-contact manner the aperture into a lower chamber pressurized with a gas pressure sufficient to substantially prevent liquid from passing through the aperture.

2. The method as set forth in claim 1, wherein the cooled fiber passes through the pressurized lower chamber and through an opening in a die, located in the bottom portion of the lower chamber, in alignment with the opening in the upper chamber.

3. The method as set forth in claim 2, wherein:
    the cooled fiber passes through the openings in spaced relation to the peripheries thereof.

4. The method as set forth in claim 3, comprising the step of:
    directing a gas flow at the cooled fiber exiting the die to evaporate any moisture thereon while simultaneously providing supplemental cooling thereto.

5. The method as set forth in claim 2, comprising the step of:
    applying a protective coating to the cooled fiber upon exiting the die.

6. The method as set forth in claim 4, comprising the step of:
    applying a protective coating to the cooled fiber subsequent to the gas directing step.

7. The method as set forth in claim 1, which further comprises the step of:
    substantially eliminating turbulence of the liquid to promote laminar flow in the upper chamber.

8. An apparatus for cooling a lightguide fiber drawn from a heated preform, the apparatus comprising:
    a housing having an upper and lower chamber;
    the upper chamber, having a first aperture in the lower portion thereof, being adapted to contain a liquid for cooling the fiber drawn therethrough; and
    the lower chamber adapted to be pressurized to substantially prevent liquid from flowing through the first aperture as a fiber is drawn therethrough in a non-contact manner.

9. The apparatus as set forth in claim 8, which further comprises:
a middle chamber intermediate the upper and lower chamber, to capture any liquid flowing from the upper chamber.

10. The apparatus as set forth in claim 8, comprising:
means for directing gas at the cooled fiber to simultaneously evaporate moisture thereon while providing supplemental cooling thereto.

11. The apparatus as set forth in claim 9, comprising:
means for directing gas at the cooled fiber to simultaneously evaporate moisture thereon while providing supplemental cooling thereto.

12. The apparatus as set forth in claim 8, comprising:
means for applying a protective coating to the cooled fiber upon exiting the housing.

13. The apparatus as set forth in claim 10, comprising:
means for applying a protective coating to the cooled fiber upon exiting the gas directing means.

14. The apparatus as set forth in claim 8, comprising:
a cylindrical screen, located in the upper chamber, through which the fiber is axially drawn, to prevent particulate in the liquid from contact with the fiber.

* * * * *